US007348058B2

(12) United States Patent
Hiramatsu et al.

(10) Patent No.: US 7,348,058 B2
(45) Date of Patent: Mar. 25, 2008

(54) ELECTRICALLY CONDUCTIVE ROLL

(75) Inventors: Hiroshige Hiramatsu, Komaki (JP); Hirofumi Okuda, Niwa-gun (JP); Satoshi Suzuki, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 104 days.

(21) Appl. No.: 10/795,419

(22) Filed: Mar. 9, 2004

(65) Prior Publication Data

US 2004/0180207 A1 Sep. 16, 2004

(30) Foreign Application Priority Data

Mar. 10, 2003 (JP) ............................ 2003-063828

(51) Int. Cl.
*B32B 25/20* (2006.01)
*B32B 27/38* (2006.01)
*G03G 15/04* (2006.01)

(52) U.S. Cl. ....................... 428/391; 399/176; 428/416

(58) Field of Classification Search ..................... None
See application file for complete search history.

(56) References Cited

U.S. PATENT DOCUMENTS 6,037,092 A * 3/2000 Heeks et al. ................ 430/124
6,063,463 A * 5/2000 Schlueter et al. ........ 428/36.91
6,261,688 B1 * 7/2001 Kaplan et al. .............. 428/391
6,365,280 B1 * 4/2002 Schlueter et al. ........... 428/447
6,411,793 B1 * 6/2002 Badesha et al. ............ 399/307
6,447,918 B1 * 9/2002 Gervasi et al. ............. 428/421
6,458,063 B2 * 10/2002 Kodama ...................... 492/59
6,733,839 B2 * 5/2004 Badesha et al. ............ 427/386
6,808,815 B2 * 10/2004 Kaplan et al. .............. 428/447
2003/0119639 A1 * 6/2003 Manabe et al. ............... 492/56
2004/0030032 A1 * 2/2004 Manabe et al. ............. 524/502

FOREIGN PATENT DOCUMENTS

JP 2002-337161 11/2002

* cited by examiner

*Primary Examiner*—Robert Sellers
(74) *Attorney, Agent, or Firm*—Kratz, Quintos & Hanson, LLP

(57) ABSTRACT

An inexpensive electrically conductive roll which is easily produced compared with conventional rolls, offers stable adhesion at the interface with time lapse after mixing adhesive components, which is not affected by environment during storage of the core after being applied with an adhesive. The electrically conductive roll comprises a shaft 11, an adhesive layer 12 formed on an outer periphery of the shaft and a base rubber layer 13 formed on an outer periphery of the adhesive layer, wherein the base rubber layer includes an addition reaction curing silicone elastomer and the adhesive layer includes a one part epoxy adhesive.

2 Claims, 1 Drawing Sheet

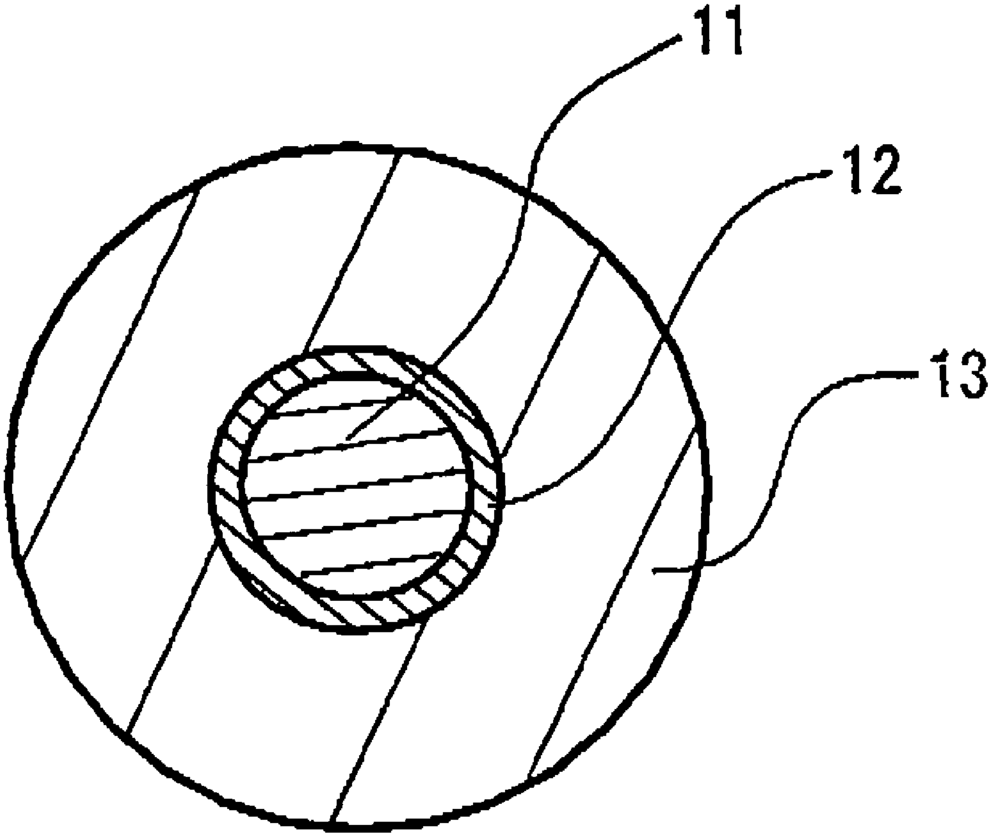
Figure

ELECTRICALLY CONDUCTIVE ROLL

BACKGROUND OF THE INVENTION

1. Field of the Invention

The present invention relates generally to an electrically conductive roll used in electrophotographic apparatus such as a copying machine, a printer, or a facsimile machine.

2. Description of the Art

An electrically conductive roll used in electrophotographic apparatus such as a copying machine, a printer, or a facsimile machine may be a developing roll, a charging roll, a transfer roll or the like. The electrically conductive roll may typically have a laminar structure comprising an elastic base rubber layer formed via an adhesive layer on an outer periphery of a core such as a shaft, and further, a surface layer formed on an outer periphery of the elastic base rubber layer. In the case that an addition reaction curing silicone elastomer is used as a material for forming the base rubber layer, a one or two part adhesive mainly comprising silicone rubber or a silane coupling agent each having a vinyl group or a hydrosilyl group, is conventionally applied on an outer periphery of the shaft and then the base rubber layer is formed (see, for example, Japanese Unexamined Patent Publication No. 2002-337161).

However, since the two part adhesive mainly comprising silicone rubber or a silane coupling agent each having a vinyl group or a hydrosilyl group has a short pot life, the adhesive tends to cause adhesive defects when it is allowed to stand for a certain amount of time after mixing. On the other hand, in the case of the one part adhesive mainly comprising silicone rubber or a silane coupling agent each having a vinyl group or a hydrosilyl group, the silane coupling agent thereof may be deactivated by reacting with water in the air and the adhesive may easily be affected by the environment during use. That is, when a base rubber layer is formed on an outer periphery of a metal core after the metal core applied with an adhesive has been stored for a period of time under wet heat conditions, the base rubber layer may exfoliate from the metal core at the interface. In addition, the adhesion of the above-mentioned adhesive greatly depends upon the thickness of the applied adhesive. In other words, when the thickness of the applied adhesive is too thick, exfoliation may easily occur. For this reason, accuracy is required when applying the adhesive, resulting in increased production cost for the rolls.

SUMMARY OF THE INVENTION

The present invention was developed in view of the above circumstances, and has an object to provide an inexpensive electrically conductive roll which is easily produced compared with conventional rolls, which offers stable adhesion at the interface with time lapse after mixing adhesive components, and which is not affected by environment during storage of the metal core after being applied with an adhesive.

To achieve the above-mentioned object, the electrically conductive roll according to the present invention comprises a shaft, an adhesive layer formed on an outer periphery of the shaft and a base rubber layer formed on an outer periphery of the adhesive layer, wherein the base rubber layer includes an addition reaction curing silicone elastomer and the adhesive layer includes a one part epoxy adhesive.

The present inventors carried out extensive studies so as to solve the above-mentioned problems. In this process, the present inventors had the concept of using a one part epoxy adhesive, which tends not to cause poor adhesion over time, for providing adhesion between a base rubber layer formed of an addition reaction curing silicone elastomer and a metal core such as a shaft. Based upon such a concept, a series of electrically conductive rolls were produced. As a result, it was found that when the above-mentioned one part epoxy adhesive was used, stable adhesion can be obtained without the use of a conventionally indispensable silane coupling agent, the adhesion does not deteriorate under wet heat conditions, and further exfoliation of the base rubber layer may not be caused due to a thick adhesive layer. Thus, the aforesaid object was achieved and the present invention was attained.

It is thought that the reason the epoxy adhesive may exert the above-mentioned effective adhesion is as follows. The epoxy group of the epoxy adhesive becomes a functional group such as a hydroxyl group by contact with water in the air so as to cause ring-opening reaction as follows.

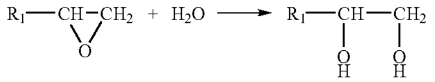

Then, dehydrogenation reaction may be caused between the functional group and a hydrosilyl group of the addition reaction curing silicone elastomer as follows.

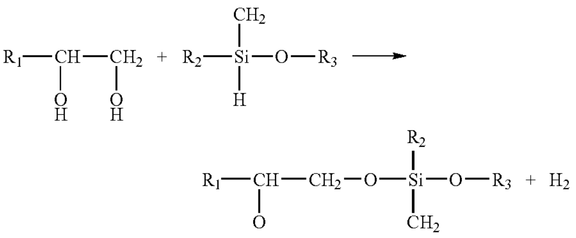

BRIEF DESCRIPTION OF THE DRAWINGS

The sole FIGURE of the drawings is a sectional view illustrating an embodiment of the electrically conductive roll of the present invention.

DESCRIPTION OF THE PREFERRED EMBODIMENTS

Embodiments of the present invention will now be described.

An electrically conductive roll of the invention comprises, for example as shown in the FIGURE, a base rubber layer 13 formed on an outer peripheral surface of a shaft 11, intervened with an adhesive layer 12 therebetween. In the present invention, the base rubber layer 13 is formed of an addition reaction curing silicone elastomer and also the adhesive layer 12 is formed of a one part epoxy adhesive.

There is no particular restriction imposed on the shaft 11. For example, a solid metal core or a hollow metal core may be used. Exemplified materials for the shaft include aluminum, stainless steel, and plated iron.

As a material used for forming the above-mentioned adhesive layer 12 formed on an outer periphery of the shaft 11, a one part epoxy adhesive is used. The adhesive preferably does not contain an amide group or an amine group because inclusion of such groups tends to inhibit hardening of the base rubber layer 13. Examples of the one part epoxy adhesive include bisphenol A epoxy, bisphenol F epoxy, bisphenol AD epoxy, phenol novolak epoxy, cresol novolak epoxy, alicyclic epoxy, glycidyl ester resin and heterocyclic epoxy resin, which may be used either alone or in combination thereof. Among them, bisphenol A epoxy adhesive is preferred because of its excellent adhesion with the base rubber layer 13. These adhesives may be electrically conductive, as required.

A phenol resin, a xylene-formaldehyde resin or the like may be added to the material of the adhesive layer 12, as required.

As a material used for the base rubber layer 13 formed on the outer periphery of the adhesive layer 12, as mentioned above, an addition reaction curing silicone elastomer is used. Examples thereof include, specifically, a silicone compound comprising a silicone elastomer containing a vinyl group, organosiloxane containing a hydrosilyl group, platinum catalyst and retardant. The silicone compound may be applied formulated as a two part system or a multi part system by separating the above-mentioned materials into two or more.

One or more of electrically conductive agents may be added to the material for forming the base rubber layer 13, as required. Examples thereof include conventional electrically conductive agents such as carbon black, graphite, potassium titanate, iron oxide, titanium dioxide, c-$TiO_2$, c-ZnO, c-$SnO_2$ and ionic conductive agents (such as a quaternary ammonium salt, a borate and a surfactant). In the present invention, the prefix 'c-' means electrically conductive.

One or more fillers may be added to the material for forming the base rubber layer 13, as required. Examples thereof include dry silica, wet silica, quarts, diatomaceous earth and inorganic fillers such as calcium carbonate.

The inventive electrically conductive roll can be prepared, for example, as follows.

First, a one part epoxy adhesive is prepared by dispersing each material for forming the adhesive layer 12 into an organic solvent such as methyl ethyl ketone (MEK). In turn, each material for forming the base rubber layer 13 is kneaded by means of a kneader for preparation of the material of the base rubber layer 13.

On the other hand, a metal shaft 11 is prepared and the adhesive, prepared beforehand, is applied onto an outer periphery of the shaft by a spray method, a dipping method or the like, which is, in turn, dried and burned at, for example, 100 to 200° C., for 10 minutes by heated air, infrared radiation or the like for forming the adhesive layer 12 on the outer periphery of the shaft 11. The shaft 11 (onto which the adhesive layer 12 is formed) is installed within a hollow space of a cylindrical mold. After filling the material prepared beforehand for the base rubber layer 13 into a space defined by the shaft within the mold, the mold is covered with a lid and the mold is heated as a whole for crosslinking the material for the base rubber layer 13 at, for example, 150 to 220° C., for 30 minutes for forming the base rubber layer 13. Thereafter, the thus molded product is removed from the cylindrical mold to obtain an electrically conductive roll (a base roll) wherein the base rubber layer 13 is formed via the adhesive layer 12 onto the outer periphery of the shaft 11 (see the FIGURE).

In the inventive electrically conductive roll, the thickness of each layer generally is appropriately determined according to the particular use of the roll. For example, when using the roll as a developing roll, the thickness of the adhesive layer 12 is preferably within a range of 0.1 to 5 μm, particularly preferably, 0.2 to 3 μm. The thickness of the base rubber layer 13 is preferably within a range of 0.1 to 10 mm, particularly preferably, 0.5 to 5 mm.

The structure of the inventive electrically conductive roll is not limited to the above laminar structure, as the electrically conductive roll may appropriately have any number of layers according to the application of the roll (a charging roll, a transfer roll or the like) by providing an intermediate layer or a surface layer on an outer periphery of the base rubber layer 13.

Examples will hereinafter be described along with Comparative Examples.

EXAMPLE 1

Material for Base Rubber Layer

Two part electrically conductive silicone rubber (X34-264 A/B available from Shin-Etsu Chemical Co., Ltd. of Tokyo, Japan) was prepared.

Adhesive

A one part epoxy-phenol mixture (Canycoat P-100, a mixture adhesive of bisphenol A epoxy resin and phenol resin, available from Toagosei Co., Ltd. of Tokyo, Japan) was prepared.

Production of Electrically Conductive Roll

A metal core made of SUS303 (having an diameter of 10 mm) was prepared as a shaft. The adhesive, prepared beforehand, was applied onto an outer periphery of the shaft and in turn was dried and burned at 200° C. for 10 minutes by heated air for forming an adhesive layer on the outer periphery of the shaft. Thereafter, the shaft (onto which the adhesive layer was formed) was installed within a hollow space of a cylindrical mold. After filling the material prepared beforehand for the base rubber layer into a space defined by the shaft within the mold, the mold was covered with a lid and the mold was heated as a whole for crosslinking the material for the base rubber layer at 170° C. for 30 minutes for forming the base rubber layer. Thereafter, the thus molded product was removed from the cylindrical mold to obtain an electrically conductive roll wherein the base rubber layer (having a thickness of 3 mm) was formed via the adhesive layer (having a thickness of 1.4 μm) onto the outer periphery of the shaft (see the FIGURE).

EXAMPLE 2

As an adhesive, a one part epoxy-phenol mixture (Canycoat P-105, an adhesive of a mixture of bisphenol A epoxy resin and phenol resin, available from Toagosei Co., Ltd.) was prepared. An electrically conductive roll was prepared in substantially the same manner as in EXAMPLE 1 except that this adhesive was used instead of the adhesive employed in EXAMPLE 1.

EXAMPLE 3

As an adhesive, a one part epoxy adhesive (Canycoat P-150, an bisphenol A epoxy adhesive, available from Toagosei Co., Ltd.) was prepared. An electrically conductive roll was prepared in substantially the same manner as in EXAMPLE 1 except that this adhesive was used instead of the adhesive employed in EXAMPLE 1.

EXAMPLE 4

As an adhesive, a one part epoxy adhesive (Canycoat P-200, a bisphenol A epoxy adhesive, available from Toagosei Co., Ltd.) was prepared. An electrically conductive roll was prepared in substantially the same manner as in EXAMPLE 1 except that this adhesive was used instead of the adhesive employed in EXAMPLE 1.

COMPARATIVE EXAMPLE 1

As an adhesive, a two part silane coupling adhesive (Primer No. 101 A/B available from Shin-Etsu Chemical Co., Ltd.) was prepared. An electrically conductive roll was prepared in substantially the same manner as in EXAMPLE 1 except that this adhesive was used instead of the adhesive employed in EXAMPLE 1 and was burned at 150° C. for 30 minutes.

COMPARATIVE EXAMPLE 2

As an adhesive, a one part silane coupling adhesive (Primer No. 4 available from Shin-Etsu Chemical Co., Ltd.) was prepared. An electrically conductive roll was prepared in substantially the same manner as in EXAMPLE 1 except that this adhesive was used instead of the adhesive employed in EXAMPLE 1 and was burned at 150° C. for 30 minutes.

COMPARATIVE EXAMPLE 3

As an adhesive, a two part silane coupling adhesive (DY39-051 A/B available from Dow Corning Toray Silicone Co., Ltd. of Tokyo, Japan) was prepared. An electrically conductive roll was prepared in substantially the same manner as in EXAMPLE 1 except that this adhesive was used instead of the adhesive employed in EXAMPLE 1 and was burned at 150° C. for 30 minutes.

COMPARATIVE EXAMPLE 4

As an adhesive, a two part silane coupling adhesive (DY39-104 A/B available from Dow Corning Toray Silicone Co., Ltd.) was prepared. An electrically conductive roll was prepared in substantially the same manner as in EXAMPLE 1 except that this adhesive was used instead of the adhesive employed in EXAMPLE 1 and was burned at 150° C. for 30 minutes.

The electrically conductive rolls thus produced were each evaluated for the properties thereof on the basis of the following criteria. The results are shown in the following Table 1.

Adhesive Reliability

During the production of each roll, after an adhesive layer was formed and then was allowed to stand at room temperature for one hour, a base rubber layer was formed. Each roll was visually observed as to the adhesive status of its base rubber layer for evaluation of adhesive reliability. Specifically, 50 pieces of the same rolls were produced and evaluated. The symbol ○ indicates that no interlaminar exfoliation was found between the adhesive layer and the base rubber layer for each of the 50 rolls, the symbol Δ indicates that the adhesive layer and the base rubber layer were not bonded, resulting in interlaminar separation at 1 to 4 rolls among 50 rolls, and the symbol X indicates that the adhesive layer and the base rubber layer were not bonded, resulting in interlaminar separation at not less than 5 rolls among 50 rolls.

Production Reliability

During the production of each roll, after an adhesive layer was formed and then was allowed to stand under wet heat conditions (at40° C.×95% RH) for 24 hours, a base rubber layer was formed. Each roll was visually observed as to the adhesive status of its base rubber layer for evaluation of adhesive reliability. Specifically, 50 pieces of the same rolls were produced and evaluated. The symbol ○ indicates that no interlaminar exfoliation was found between the adhesive layer and the base rubber layer for each of the 50 rolls, the symbol Δ indicates that the adhesive layer and the base rubber layer were not bonded, resulting in interlaminar separation at 1 to 4 rolls among 50 rolls, and the symbol X indicates that the adhesive layer and the base rubber layer were not bonded, resulting in interlaminar separation at not less than 5 rolls among 50 rolls.

Dependency on Thickness of Adhesive Layer

Thickness of the adhesive layer was varied at five levels (0.24μm, 0.43 μm, 1.4 μm, 3.9 μm and 6.5 μm) between 0.24 to 6.5 μm. Rolls having an adhesive layer of each of the five levels were produced. The symbol ○ indicates that the base rubber layer was ruptured at all of five levels when peeling off the base rubber layer. The symbol X indicates that interlaminar separation was found at any of five levels.

TABLE 1

| | EXAMPLE | | | | COMPARATIVE EXAMPLE | | | |
|---|---|---|---|---|---|---|---|---|
| | 1 | 2 | 3 | 4 | 1 | 2 | 3 | 4 |
| Adhesive reliability | ○ | ○ | ○ | ○ | X | Δ | X | Δ |
| Production reliability | ○ | Δ | ○ | ○ | X | X | X | X |
| Dependency on thickness of adhesive layer | ○ | ○ | ○ | ○ | X | X | X | X |

The results shown in Table 1 suggest that all the electrically conductive rolls of the Examples showed an excellent adhesive reliability and caused no interlaminar separation, even when the metal core was allowed to stand under wet heat conditions after being applied with adhesive. Further, it was found that all of the electrically conductive rolls of the Examples may easily be produced from the evaluation in terms of dependency on thickness of the adhesive layer.

On the other hand, it was found that all of the electrically conductive rolls of the Comparative Examples were inferior in adhesive reliability, which were further deteriorated after being allowed to stand under wet heat conditions, and were inferior in dependency on thickness of an adhesive layer.

As mentioned above, the inventive electrically conductive roll uses the addition reaction curing silicone elastomer as a material for forming the base rubber layer and uses a one part epoxy adhesive as a material for forming the adhesive layer between the base rubber layer and the shaft. Therefore, adhesive reliability can be obtained by reaction between the base rubber layer and the adhesive layer compared with the case where a silane coupling agent is used. Further, the inventive electrically conductive roll tends not to be affected by the production environment and the adhesion is not deteriorated under wet heat conditions, resulting in excellent product reliability. Still further, since the above-mentioned one part epoxy adhesive tends not to cause adhesive defects after being allowed to stand and also the adhesion does substantially not depend on the thickness of the adhesive layer, the inventive electrically conductive roll is easily produced and is inexpensive compared with the conventional rolls.

Especially, when the one part epoxy adhesive is a bisphenol A epoxy adhesive, the adhesion is particularly improved with the base rubber layer formed by the addition reaction curing silicon elastomer.

What is claimed is:

1. An electrically conductive roll to be used as a developing roll, a charging roll or a transfer roll, the electrically conductive roll comprising a shaft, an adhesive layer formed on an outer periphery of the shaft and a base rubber layer formed on an outer periphery of the adhesive layer, wherein the base rubber layer includes an addition reaction curing silicone elastomer having a hydrosilyl group and the adhesive layer includes a one part bisphenol A epoxy adhesive.

2. An electrically conductive roll according to claim 1, wherein the one part bisphenol A epoxy adhesive does not contain a silane coupling agent.

* * * * *